United States Patent [19]

Collins, Jr. et al.

[11] Patent Number: 5,142,131
[45] Date of Patent: Aug. 25, 1992

[54] HAND-HELD BAR CODE READER

[75] Inventors: Donald A. Collins, Jr.; Charles K. Wike, Jr., both of Ithaca, N.Y.

[73] Assignee: NCR Corporation, Dayton, Ohio

[21] Appl. No.: 750,224

[22] Filed: Aug. 19, 1991

Related U.S. Application Data

[63] Continuation of Ser. No. 396,504, Aug. 21, 1989, abandoned.

[51] Int. Cl.⁵ .............................................. G06K 7/10
[52] U.S. Cl. .................... 235/472; 235/435; 235/462; 235/482
[58] Field of Search ................ 235/435, 462, 472, 482

[56] References Cited

U.S. PATENT DOCUMENTS

| | | | |
|---|---|---|---|
| 3,826,900 | 7/1974 | Moellering | 235/472 |
| 3,947,817 | 3/1976 | Requa | 340/146.3 MA |
| 3,978,318 | 8/1976 | Romeo et al. | 235/472 |
| 4,251,798 | 2/1981 | Swartz et al. | 340/146.3 SY |
| 4,346,292 | 8/1982 | Routt, Jr. et al. | 250/216 |
| 4,420,682 | 12/1983 | Huber | 235/472 |
| 4,460,120 | 7/1984 | Shepard et al. | 235/472 |
| 4,471,218 | 9/1984 | Culp | 235/472 |
| 4,521,678 | 6/1985 | Winter | 235/472 |
| 4,521,772 | 6/1985 | Lyon | 340/710 |
| 4,575,625 | 3/1986 | Knowles | 235/467 |
| 4,639,070 | 1/1987 | Ikeda et al. | 350/3.71 |
| 4,656,345 | 4/1987 | Kurimoto | 235/472 |
| 4,675,531 | 6/1987 | Clark et al. | 250/568 |
| 4,678,288 | 7/1987 | Lonsdale et al. | 350/432 |
| 4,699,447 | 7/1990 | Howard | 350/6.9 |
| 4,703,186 | 10/1987 | Nakayama et al. | 250/566 |
| 4,766,299 | 8/1988 | Tierney et al. | 235/472 |
| 4,809,351 | 2/1989 | Abramovitz et al. | 235/474 |
| 4,894,523 | 1/1990 | Chadina, Jr. et al. | 235/472 |
| 4,906,843 | 3/1990 | Jones et al. | 235/449 |
| 4,916,441 | 4/1990 | Gambrich | 340/712 |

FOREIGN PATENT DOCUMENTS 8712320.7  6/1987  Fed. Rep. of Germany.

*Primary Examiner*—Harold Pitts
*Attorney, Agent, or Firm*—Richard W. Lavin

[57] ABSTRACT

A portable hand-held optical scanner comprises a disk-shaped housing which fits within the palm of the hand of a checkout operator, which scanner includes a scanning mechanism for generating a scanning pattern for scanning coded indicia, a strap member for securing the hand of the operator to the housing, a switch mounted on the rear surface of the housing adjacent the fingers of the operator for easy operation by the operator, a data processor and a transmitter for transmitting the data read by the scanner to a remote pickup.

16 Claims, 3 Drawing Sheets

HAND-HELD BAR CODE READER

This is a continuation of co-pending application Ser. No. 396,504 filed on Aug. 21, 1989 now abandoned.

CROSS-REFERENCE TO RELATED APPLICATION

Composite Lens for a Hand-Held Bar Code Reader, co-pending U.S. application Ser. No. 284,646, filed on Dec. 15, 1988, now U.S. Pat. No. 4,935,609 invented by Charles Wike.

BACKGROUND OF THE INVENTION

This invention relates to laser bar code readers and more particularly to hand-held laser bar code readers.

Present checkout systems found in retail or supermarket stores include a point-of-sale terminal positioned adjacent a checkout counter which includes an optical scanning device for scanning a bar code pattern on a label attached to a purchased merchandise item. The scanning device generates signals representing the coded data on the label which are used to generate the price of the purchased item. In some checkout systems, a hand-held bar code reader has been utilized where the purchased merchandise items can be easily handled by the checkout operator so as to position the reader adjacent the bar code label on the purchased merchandise item. To effectively scan a bar code label, prior hand-held bar code readers have required that the operator align the scanning head of the bar code reader with the bar code label. This has required the operator to be particularly attentive to the location of the scanning head of the bar code reader with respect to the coded label. It would be desirable to have the hand-held reader mounted on the hand of the checkout operator in such a manner as to enable the checkout operator to easily align the scanning head of the reader on the coded label. It would also be desirable to have the bar code reader constructed so as to be used in any location within the supermarket.

SUMMARY OF THE INVENTION

There is provided a hand-held portable bar code reader comprising a compact disk type casing having a scanning unit mounted within the casing. The casing is constructed to have a shape which fits completely within the palm of the operator's hand and which is held on the hand by means of a strap secured to the casing. An on/off switch protrudes from the surface of the casing and is operated by the thumb of the operator enabling the operator to easily scan a coded label on a purchased merchandise item which is located adjacent the reader. The scanning unit of the bar code reader includes a laser diode for generating a scanning light beam, a pair of reflecting mirror portions of a composite lens member mounted on the glass face of the casing in which the mirror portions reflect the laser beam in a direction which is opposite to the direction of the laser beam outputted by the diode and at a rotating deflecting mirror mounted within the hollow armature of a motor mounted on the spin axis of the reader. Mounted around the inside periphery of the front opening of the casing are a plurality of pattern forming mirrors for receiving the light beams from the rotating mirror and projecting the scanning light beams in the form of a scanning pattern at the coded label. The light reflected from the coded label is redirected through the pattern forming mirrors, the rotating mirror and to a collection mirror portion of the composite lens member which collects and focuses the light beams at a photodetector mounted within the casing adjacent the motor. The photodetector converts the scanning light beams into electrical signals which are transmitted to a microprocessor which checks and decodes the electrical signal to verify the validity of the read operation. The decoded signals are then transmitted by a transmitter located within the casing to a remote pickup which transmits the signals to a remote processor for processing. The processed data is transmitted to a remote price lookup table from which the price of the scanned merchandise item is retrieved. Located within the casing is a buffer/storage unit for storing data and a loudspeaker which generates a tone indicating that the scanning operation has resulted in a good read of the bar code label. The microprocessor controls the operation of the various operating elements of the reader.

It is therefore a principal object of this invention to provide a portable optical bar code reader which can be easily mounted in the palm of the hand of the checkout operator allowing the operator to easily position and move the reader past a bar code label on a purchased merchandise item.

It is another object of this invention to provide a compact hand-held bar code reader which can be conveniently operated by the operator when the bar code reader is secured to the palm of the hand of the operator.

It is another object of this invention to provide a bar code reader which is simple in construction and low in cost.

BRIEF DESCRIPTION OF THE DRAWINGS

These and other objects, features and advantages of the invention, as well as the invention itself, will become more apparent to those skilled in the art in light of the following detailed description, taken in consideration with the accompanying drawings, wherein like reference numerals indicate like or corresponding parts throughout the several views and wherein.

DESCRIPTION OF THE PREFERRED EMBODIMENT

Figure 1:
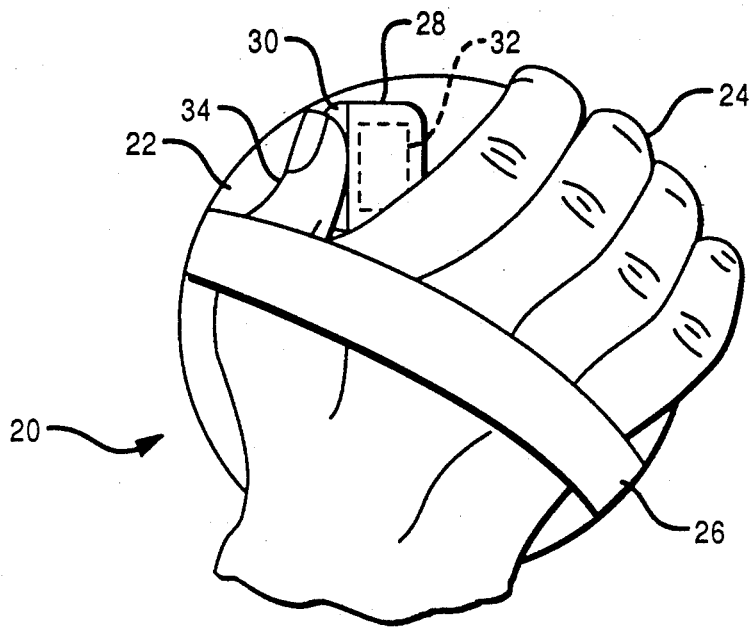
FIG. 1 is a reduced perspective view of the optical bar code reader of the present invention when positioned in the palm of the hand of the checkout operator showing the strap member which secures the bar code reader to the hand of the checkout operator and the trigger mechanism operated by the thumb of the checkout operator for energizing the bar code reader.

Referring now to FIG. 1, there is shown a reduced perspective view of the optical bar code reader of the present invention generally indicated by the numeral 20 and comprising a disk-shaped casing or housing member 22 having a diameter which is small enough to be placed within the palm of a checkout operator's hand 24 and held there by means of a strap member 26 secured to the housing member 22. The strap member 26 may be fabricated of a velcro material enabling the hand 24 of the checkout operator to be easily released from engagement with the housing member 22. Extending from the outer surface of the housing member 22 is a housing extension portion 28 including a depressible switch member 30 for energizing the operating elements of the bar code reader. Located within the housing portion 28 is a battery 32 which powers the various operating elements of the bar code reader. As shown in FIG. 1, the housing portion 28 is located along the edge of the housing member 22 and positioned to be comfortably engaged by the thumb 34 of the operator for operating the switch member 30.

Figure 2:
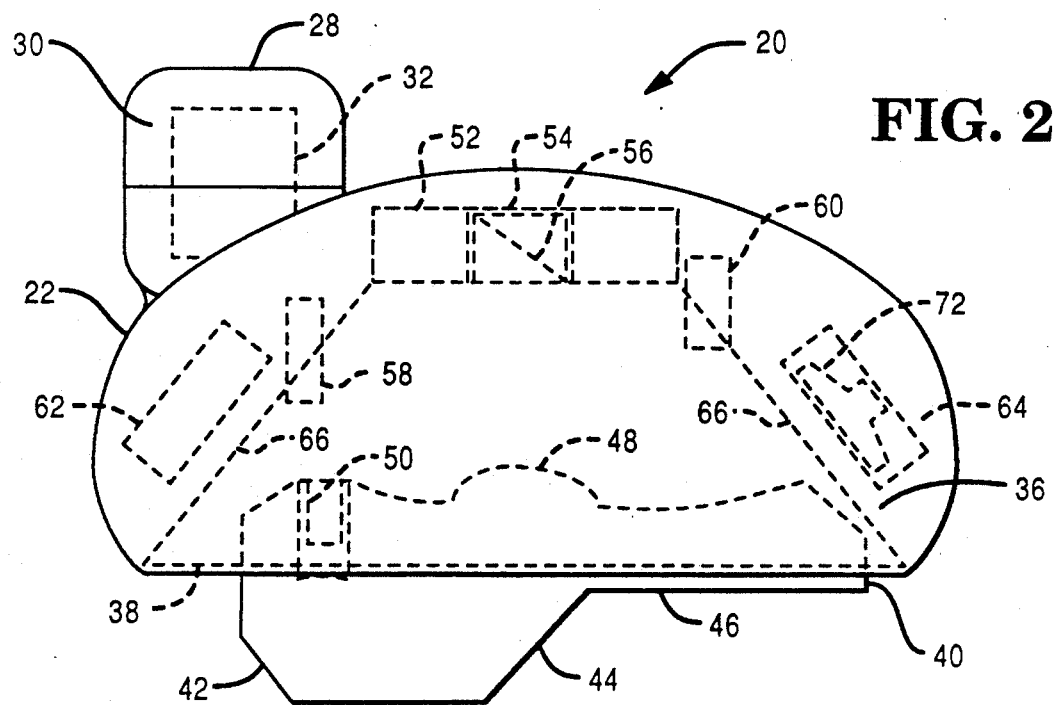
FIG. 2 is a side view of the optical bar code reader of the present invention.

Referring now to FIG. 2, there is shown a side view of the bar code reader 20 showing the general arrangement of the operating elements of the reader. The housing member 22, which may be constructed of any type of plastic material such as polycarbonate, has a recessed portion 36 which is enclosed by a glass face member 38 on which is mounted a composite lens member 40. As fully disclosed in the previously cited co-pending application Ser. No. 284,646, which application is fully incorporated herein by reference, the lens member 40 comprises a pair of internal reflecting mirror portions 42 and 44, a collection mirror portion 46, a collimator lens portion 48 and a focusing diode member 50.

Mounted on the central axis of the housing member 22 is a rotary motor drive member 52 which rotates a hollow armature drive member 54 including a commutator 55. Mounted within the drive member 54 is a deflecting mirror member 56 orientated at any angle to the spin axis of the drive member 52 such as 45 degrees. Mounted within the housing member 22 and adjacent the motor drive member 52 is a laser diode 58 member which generates a laser light beam for transmission to the composite lens member 40. Also positioned adjacent the motor drive member 52 is a photodetector member 60 which receives the deflected light beams from the collection mirror portion 46 of the lens member 40 and generates electrical signals in accordance with the intensity of the light beams received. Also mounted within the housing member adjacent the motor drive member 52 are operating elements of the bar code reader 20 which housing 1 member includes a transmitter member 62 (FIGS. 2, 4, 6 and 7) for transmitting signals generated by the photodetector member 60 and a microprocessor member 64 (FIGS. 6 and 7) for decoding the signals read by the photodetector member and for controlling the operation of the various elements of the bar code reader. Mounted around the inside periphery of the recessed portion 36 are a plurality of pattern forming mirror members 66 (FIGS. 2, 4 and 5) which are mounted offset to each other which reflect and project the light beams received from the deflecting mirror member 56 towards a bar coded label (not shown) on the purchased merchandise item in a manner to be described more fully hereinafter.

Figure 3:
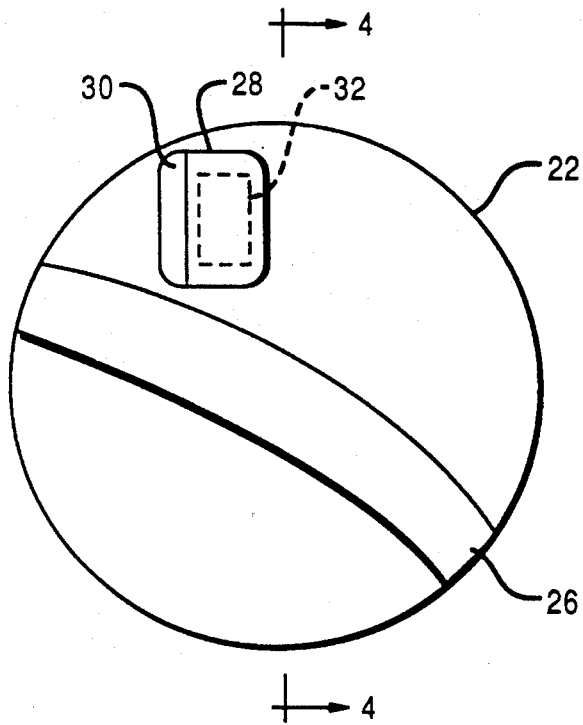
FIG. 3 is a reduced rear view of the optical bar code reader of the present invention.

Referring now to FIG. 3, there is shown a reduced rear view of the bar code reader 20 of the present invention which includes the housing portion 28 within which is mounted the depressible switch member 30 and the battery 32. There is also shown in FIG. 3 the location of the strap member 26 which can be mounted to the housing member 22 in any conventional manner.

Figure 4:
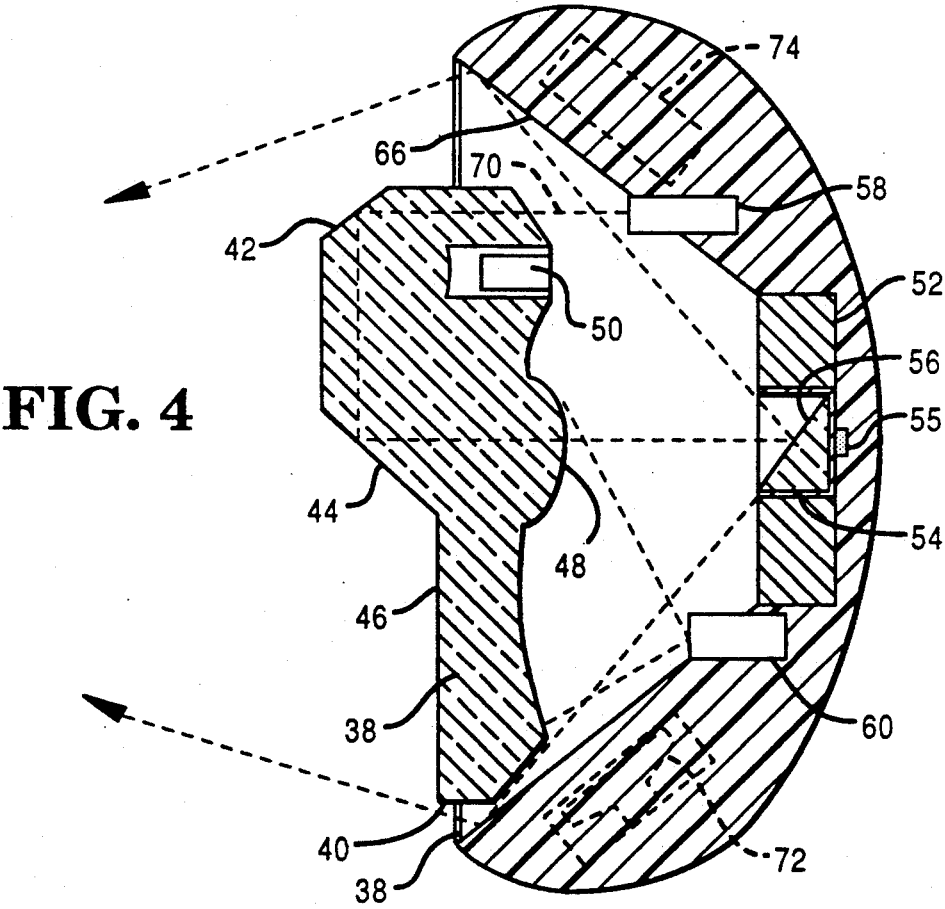
FIG. 4 is a sectional side view of the optical bar code reader of the present invention taken on line 4—4 of FIG. 3.
Figure 5:
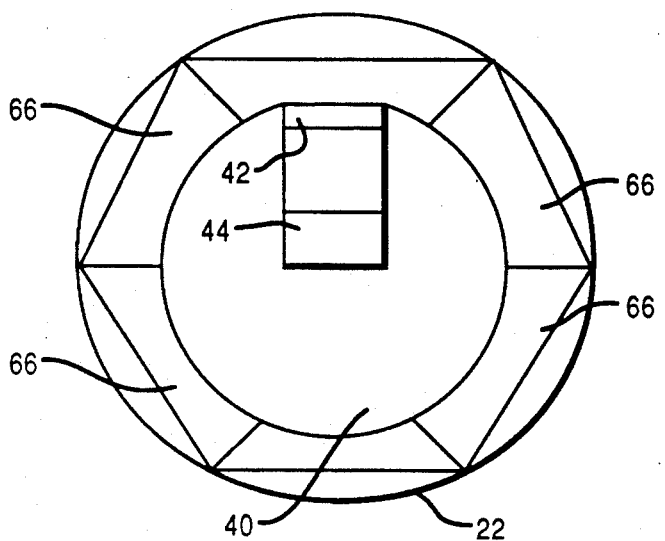
FIG. 5 is a reduced front view of the optical bar code reader of the present invention.

Referring now to FIG. 4, there is shown a sectional side view of the bar code reader 20 of the present invention taken on line 4—4 of FIG. 3 showing the path of the scanning light beam. The light beam 70 emitted from the laser diode member 58 is projected along a first light path at the reflecting mirror portion 42 of the lens member 40 which reflects the light beam towards the mirror portion 44. The mirror portion 44 will reflect the light beam along a second light path which is parallel to and in an opposite direction to the first light path. The light beam 70 projected along the second light path will be collimated by the collimator lens portion 48 of the lens member 40 and impact on the rotating deflecting mirror member 56 which deflects the light beam outwardly at an acute angle to the second path towards the pattern forming turning mirror members 66. In response to receiving the light beam deflected by the deflecting mirror member 56, the mirror members 66 will direct the light beams in the form of a multiline pattern (not shown) at a target area in which is located the bar coded label (not shown) that is to be scanned. As fully described in the previously cited co-pending application Ser. No. 284,646, the positioning of the bar code reader 20 with respect to the bar code label is controlled by the diode member 50 which projects a spot of light on the label. The size of the spot projected with respect to the lines of the scanning pattern determines the focal plane of the projected scanning pattern.

The scattered light beams reflected from the scanned bar coded label are redirected back towards the pattern forming mirror members 66 which reflect the light beams at the deflecting mirror member 56 which in turn deflects the light beams to the collection mirror portion 46 of the lens member 40. The light beams collected by the collection mirror portion 46 of the lens member 40 will be focused on the photodetector member 60, resulting in the generation of electrical signals representing the coded data located on the bar coded label. In the present application, there are six pattern forming mirror members 66. The electrical signals generated by the photodetector member 60 are transmitted to the microprocessor member 64 (FIGS. 2, 6 and 7) which checks and decodes the electrical signals to determine if a valid read operation has occurred. If it has, the transmitter member 62 is enabled by the microprocessor member to transmit the decoded signals to a remote pickup such as a data terminal device (not shown) for use in obtaining the price of the purchased merchandise item scanned by the bar code reader. As part of this operation, the microprocessor member will enable the loudspeaker member 72 (FIGS. 6 and 7) to generate a tone signal indicating whether a good read operation had occurred.

Figure 6:
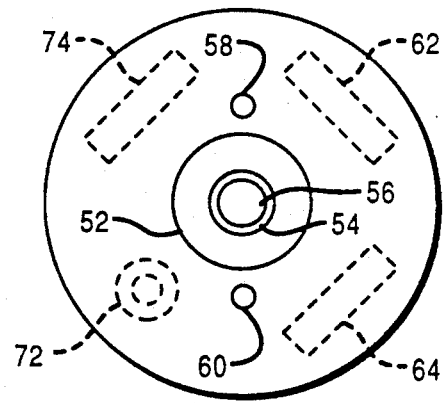
FIG. 6 is a reduced front view of the optical bar code reader of the present invention with the composite lens member removed showing the location of the loudspeaker, various operating elements of the reader, the laser diode and the photodetector.

Referring now to FIG. 6, there is shown a reduced front view of the bar code reader 20 of the present invention with the lens member 40 and the glass face member 38 removed showing the location of the motor member 52, the deflecting mirror member 56 and the various operating elements of the bar code reader. Mounted within the housing member 22 are the loudspeaker member 72, the transmitter member 62, the microprocessor member 64 and a storage/buffer member 74 which stores the data to be transmitted by the transmitter member 62. Mounted adjacent the motor member 52 is the laser diode member 58 and the photodetector member 60.

Figure 7:
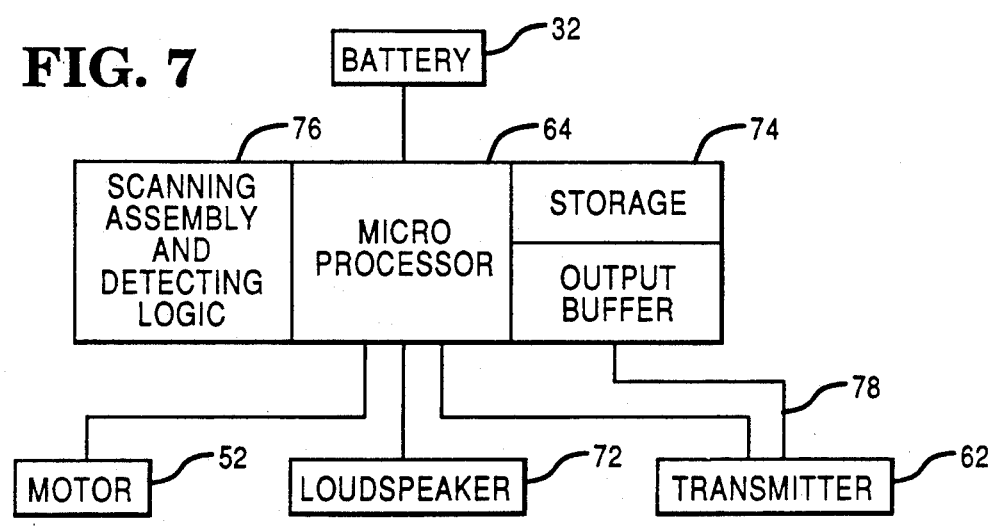
FIG. 7 is a block diagram of the data processing system of the present invention.

Referring now to FIG. 7, there is shown a block diagram of the data processing system employed in the present invention. Included in the data processing system is a scanning assembly 76 which includes the elements of the bar code reader for generating the scanning pattern and a detecting logic unit which includes the photodetector member 60 for converting the received light beams into electrical signals. Further included in the processing system is the microprocessor member 64 for checking and decoding the signals read by the detecting logic unit and for generating control signals for operating the transmitter member 62 and the loudspeaker member 72 indicating the validity of a scanning operation by the scanning assembly as previously described. Also included in the data processing system is the conventional storage/buffer member 74 for outputting the data signals read by the detecting logic unit of the scanning assembly 76 over line 78 to the transmitter member 62 under the control of the microprocessor member 64, the transmitter member transmitting the data signals to a remote pickup unit (not shown). The microprocessor member 64 is also connected to the battery 32 and the motor member 52 for controlling their operation.

It will be seen that the portable bar code reader of the present invention is easier to use than hand-held scanners of the prior art since the multiple line scanning pattern generated by the present invention covers a wider area as compared to the single line scan pattern generated by prior hand-held scanner allowing the reader to be properly positioned adjacent the coded label. Due to its compact construction and its positioning within the palm of the hand, the bar code reader can be easily moved across the coded label.

Although the preferred embodiment of the present invention has been described herein, it will be understood by those skilled in the art that various changes can be made therein without departing from the spirit and scope of the invention. For example, a knob may be attached to the reader for grasping by the operator to hold the reader during a scanning operation. An on/off switch may be mounted along the perimeter of the reader for actuation by the tip of the operator's finger. Therefore, it is to be understood that the present invention is not to be limited beyond that as required by the appended claims.

What is claimed is:

1. A hand-held optical scanner for scanning and reading bar coded symbols comprising:
    a disk-shaped housing member including a curved outer surface enclosing a circular recessed portion having an opening, said housing member having a configuration whose width is greater than its height enabling the housing member to be completely positioned and held within the palm of the hand of an operator;
    means mounted within the recessed portion adjacent the curved outer surface for projecting scanning beams in a direction perpendicular to said curved outer surface through said recessed portion at bar coded symbols positioned adjacent the opening of said recessed portion;
    means secured to the curved outer surface for securing the housing member to the palm of the hand of the operator enabling the operator to move the optical scanner adjacent the coded symbol using only the palm of the hand; and
    a switch member extending outwardly from said curved outer surface adjacent the palm and fingers of the hand of the operator while the hand is engaged by said securing means for enabling at least one of the fingers of the hand of the operator to move in a direction parallel to the curved outer surface of the housing member to actuate the switch member enabling the projection means to project scanning light beams in a direction perpendicular to the palm of the hand for scanning bar coded symbols positioned adjacent the opening of the circular recessed portion.

2. The optical scanner of claim 1 in which said housing member includes a circular sidewall portion and a rearwall portion forming said recessed portion, said recessed portion extending along the longitudinal axis of the housing member, said projecting means including;
    a source of scanning light beams mounted in said sidewall portion of said housing member for projecting the light beams along a first path towards the opening of said recessed portion;
    an optical member mounted across the opening of said recessed portion and in said first path for deflecting the light beams along a second path which is parallel to but opposite in direction to said first path;
    a drive member mounted in said rearwall portion of said housing member and in said second path including support means adapted for rotation by operation of said drive means;
    deflecting means mounted on said support means and positioned in said second path for deflecting the light beams along a plurality of third paths which extend at an acute angle to said second path; and
    reflecting means mounted along the peripheral surface of said sidewall portion in said housing member and in said third paths for reflecting the light beams in a scanning direction through the opening of said recessed portion to form a scanning pattern for scanning the bar coded symbols.

3. The optical scanner of claim 1 which includes a detector member mounted in the sidewall portion of said housing member adjacent said drive member for generating electrical signals in response to receiving light beams of varying intensity, said optical member including a collecting portion for collecting the light beams reflected from the scanned bar coded symbols and for focusing the reflected light beams on the detector member.

4. The optical scanner of claim 3 which further includes processing means mounted in the sidewall portion of said housing member and coupled to said detector number for decoding the electrical signals generated by said detector number and for verifying the validity of the reading of the coded symbols.

5. The optical scanner of claim 4 which further includes a transmitter ember mounted in the sidewall portion of said housing member and coupled to said processing means for transmitting the signals decoded by the processing means to a remote pickup in response to the processing means verifying the validity of the reading of the coded symbols.

6. The optical scanner of claim 5 which further includes a loudspeaker mounted in the sidewall portion of said housing member and coupled to said processing means for generating a tone signal indicating the occurrence of a valid read operation in response to the processing means verifying the validity of the reading of the coded symbols.

7. The optical scanner of claim 1 in which said housing member includes a housing extension protruding from the curved outer surface of the housing member, said switch member being slidably mounted for movement within the housing extension in a direction along the outer surface of the housing member for actuation by a finger of the checkout operator when positioned adjacent the housing extension.

8. The optical scanner of claim 7 which further includes a power source mounted in said housing extension and enabled by the acutation of said switch means to operate said scanner.

9. The optical scanner of claim 6 which further includes storage means mounted in the sidewall portion of said housing member and coupled to said processing means and said transmitter means for temporarily storing the decoded data outputted by the processing means, which data is to be transmitted to the transmitter means for transmission to the remote pickup.

10. A portable hand-held optical scanner for scanning and reading bar coded indicia comprising:
a disk-shaped housing member having a configuration whose width is greater than its height enabling the housing member to be completely positioned within the palm of the hand of an operator, said housing member having a curved outer surface enclosing a circular shaped recessed portion having an opening extending the length of the housing member and engaged by the palm of the hand of the operator, said recessed portion including a rearwall portion and a circular sidewall portion forming said recessed portion which extends along the longest axis of the housing member;
means mounted within said recessed portion adjacent the rearwall portion for projecting scanning light beams in a direction perpendicular to said rearwall portion at bar coded indicia positioned adjacent the opening of the recessed portion;
a strap member secured to said curved outer surface of the housing member for securing the palm of the hand of the operator to the curved outer surface of the housing member enabling the operator to move the optical scanner adjacent the coded indicia using only the palm of the hand; and
a switch member extending outwardly from the curved outer surface of the housing member adjacent the hand of the operator when the hand is engaged by said strap member for enabling at least one finger of the hand to actuate the switch number when moved in a direction parallel to the curved outer surface of the housing number enabling the projecting means to project scanning light beam sin a direction perpendicular to the palm of the hand for scanning bar coded indicia positioned adjacent the recessed portion of the housing member.

11. The optical scanner of claim 10 in which said projecting means includes:
a source of laser light beams mounted in the sidewall portion of said recessed portion for projecting the laser light beam along a first path towards the opening of said recessed portion of the housing member;
an optical lens member extending across the opening of said recessed portion and in said first path for deflecting light beams along a second path which is parallel to but opposite in direction to said first path;
motor means mounted in the rearwall portion of said recessed portion and in said second path;
said motor means including a hollow drive member mounted in said second path, said drive member being rotated by said motor means upon operation of said motor means;
a first optical member mounted within said drive member for deflecting the light beams outwardly from said second path along a plurality of third paths; and
a plurality of second optical members mounted in the circular sidewall portion adjacent the opening of said recessed portion and in said third paths for reflecting the laser light beams in a scanning direction to form a scanning pattern for scanning coded indicia positioned adjacent the opening of the recessed portion.

12. The optical scanner of claim 11 which further includes detector means mounted in the sidewall portion of said recessed portion adjacent the motor means for generating electrical signals in response to receiving light beams of varying intensity, said lens member including collecting means for collecting the light beams reflected from the scanned coded indicia and for focusing the reflected light beams on the detector means.

13. The optical scanner of claim 12 in which the housing member includes a housing extension protruding from the outer surface of the housing member, said switch member being mounted in said housing extension to be operated by one of the fingers of the operator when the hand of the operator is engaged by said strap member.

14. The optical scanner of claim 13 which further includes a battery mounted in said housing extension and enabled by the operation of said switch member to operate the optical scanner.

15. The optical scanner of claim 12 which further includes processing means mounted in the sidewall portion of said recessed portion and coupled to said detector means for decoding the electrical signals generated by said detector means, said scanner further including transmitting means mounted in the sidewall portion of said housing member and coupled to said processing means for transmitting the decoded electrical signals to a remote pickup.

16. A portable hand-held optical scanner for scanning and reading bar coded indicia comprising:
a disk-shaped housing member having a configuration whose width is greater than its height enabling the housing member to be completely positioned within and held by the palm of the hand of an operator, said housing member having a curved outer surface enclosing a circular shaped recessed portion having an opening extending the length of the housing member, said outer surface engaged by the palm of the hand of the operator, said recessed portion including a rearwall portion and a circular sidewall portion forming said recessed portion which extends along the longest axis of the housing member;
a source of laser light beams mounted in said sidewall portion adjacent said rearwall portion for projecting the laser light beams along a first path towards the opening of the recessed portion;

an optical lens member mounted in and across the opening of said recessed portion and in said first path for deflecting the light beams along a second path which is parallel to but opposite in direction to said first path;

motor means mounted in said rearwall portion adjacent said outer surface and in said second path;

a hollow drive member mounted within said motor means and in said second path, said drive member being rotated by said motor means upon operation of said motor means;

a first optical member mounted within said drive member and said motor means and in said second path for deflecting the light beams outwardly from said second path along a plurality of third paths;

a plurality of second optical members mounted along the peripheral edge of the circular sidewall portion of said recessed portion and in said third paths for reflecting the laser light beams in a scanning direction through said opening of the recessed portion to form a scanning pattern for scanning bar coded indicia positioned adjacent the opening of the recessed portion;

a strap member secured to the outer surface of the housing member for securing the palm of the hand of the operator to the outer surface of the housing member enabling the operator to move the optical scanner adjacent the coded indicia using only the palm of the hand;

a switch member extending outwardly from said curved outer surface of the housing member adjacent the hand of the operator when the hand is engaged by said strap member for enabling at least one finger of the hand to actuate the switch member enabling the optical scanner to be operated;

said housing member further including a housing extension protruding from the outer surface of the housing member, said switch member being mounted in said housing extension to be operated by one of the fingers of the operator when moved in a direction parallel to the outer surface of the housing member when the hand of the operator is engaged by said strap member;

a battery mounted in said housing extension and enabled by the operation of said switch member to operate the optical scanner;

a detector member mounted in the sidewall portion of said recessed portion adjacent the motor means and the rearwall portion for generating electrical signals in response to receiving light beams of varying intensity reflected from scanned bar coded indicia, said lens member including a collecting portion for collecting the light beams reflected from the scanned bar coded indicia and focusing the reflected light beams on the detector means;

processing means mounted in the sidewall portion of said housing member adjacent the outer surface and coupled to said detector member for decoding the electrical signals generated by said detector member;

transmitting means mounted in the sidewall portion of said recessed portion adjacent the outer surface of said housing member and coupled to said processing means for transmitting the decoded electrical signals to a remote pickup;

loudspeaker means mounted in the sidewall portion of said recessed portion adjacent the outer surface of said housing member and coupled to said processing means for generating a tone signal indicating the occurrence of a valid read operation in response to the processing means verifying the validity of the reading of the coded indicia; and storage means mounted in the sidewall portion of said recessed portion adjacent the outer surface of said housing member and coupled to said processing means and said transmitting means for temporarily storing the decoded data outputted by the processing means, which data is transmitted to the transmitting means for transmission to the remote pickup.

* * * * *

UNITED STATES PATENT AND TRADEMARK OFFICE
CERTIFICATE OF CORRECTION

PATENT NO. : 5,142,131
DATED : August 25, 1992
INVENTOR(S) : Donald A. Collins, Jr. et al.

It is certified that error appears in the above-identified patent and that said Letters Patent is hereby corrected as shown below:

Column 6, line 61, "ember" should be --member--.

Column 7, line 57, "beam" should be --beams--; "sin" should be --in--.

Signed and Sealed this

Fourteenth Day of September, 1993

Attest:

BRUCE LEHMAN

Attesting Officer

Commissioner of Patents and Trademarks